United States Patent [19]
Farrell

[11] 3,809,515
[45] May 7, 1974

[54] EXTRUSION DIE FOR BLOWING PLASTIC FILM

[75] Inventor: John J. Farrell, Greenbrook, N.J.

[73] Assignee: Farrell Patent Company, Dunellen, N.J.

[22] Filed: Mar. 3, 1972

[21] Appl. No.: 231,501

[52] U.S. Cl................. 425/133, 425/131, 425/206, 425/462, 425/467
[51] Int. Cl............................................. B29f 3/12
[58] Field of Search .......... 425/131, 133, 207, 206, 425/380, 461, 462, 467; 259/185; 259/4

[56] References Cited
UNITED STATES PATENTS

| | | | |
|---|---|---|---|
| 3,026,565 | 3/1962 | Bonner | 425/380 X |
| 3,122,788 | 3/1964 | Lieberman | 425/206 X |
| 3,146,495 | 9/1964 | Sanford | 425/380 |
| 3,241,503 | 3/1966 | Schafer | 425/462 |

Primary Examiner—Richard B. Lazarus
Attorney, Agent, or Firm—Sandoe, Hopgood & Calimafde

[57] ABSTRACT

This die for blowing plastic film obtains better mixing of the plastic from different supply lines before extrusion and thus avoids visible "weld lines" in the finished film. The improved mixing results from the use of generally spiral passages leading from the supply passages to the cylindrical clearance that forms the discharge outlet of the die. The spiral passages are formed by grooves in an annular plate located between the core supply passages and the cylindrical clearance through which the plastic flows to the die outlet. The grooved surface of the place touches a confronting surface near the inner edge of the plate but the confronting surfaces diverge slightly as they extend outward so that plastic can leak radially across space between spiral grooves and into the cylindrical clearance that leads to the die discharge outlet. Adjustments of passage cross sections obtain uniform thickness of the blown film.

20 Claims, 12 Drawing Figures

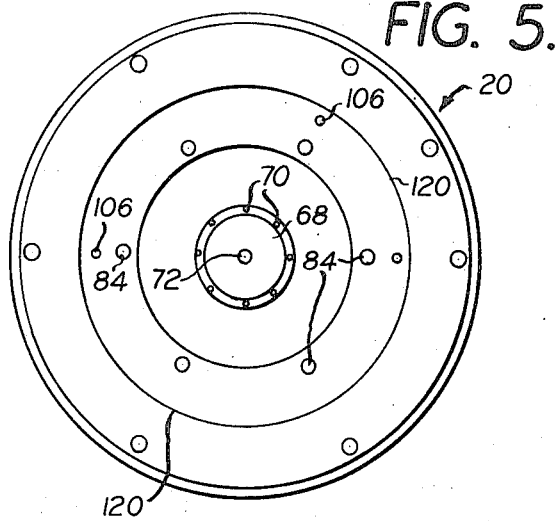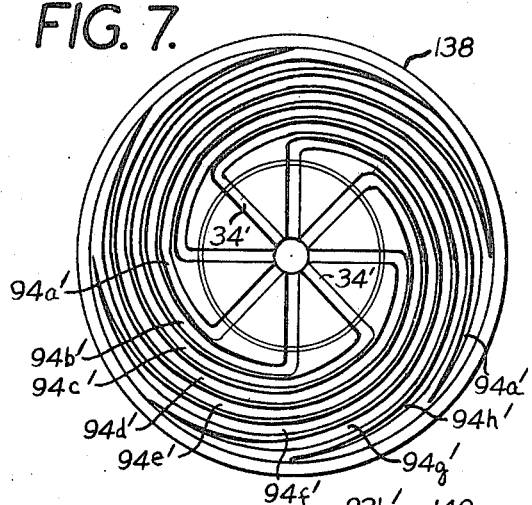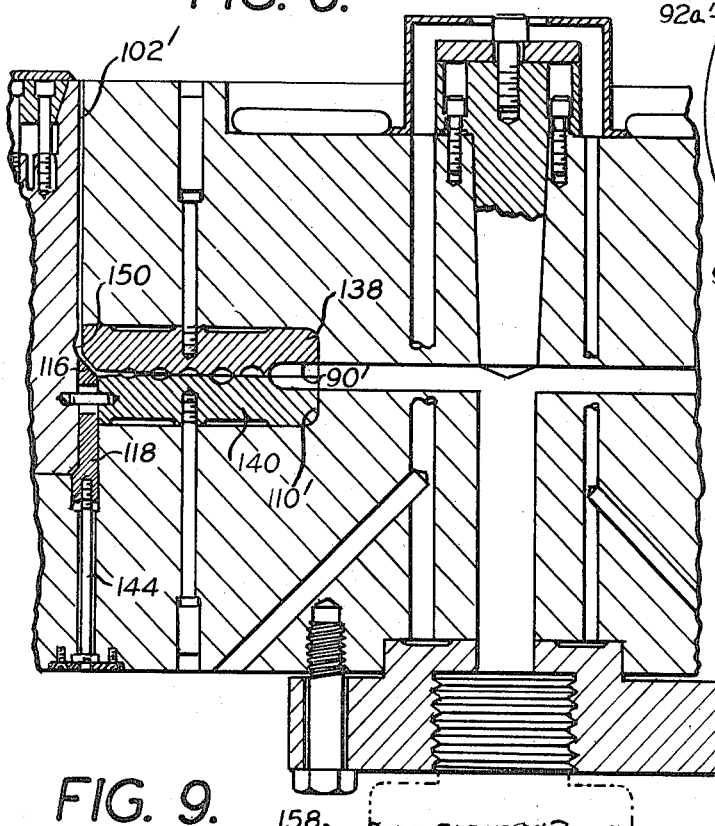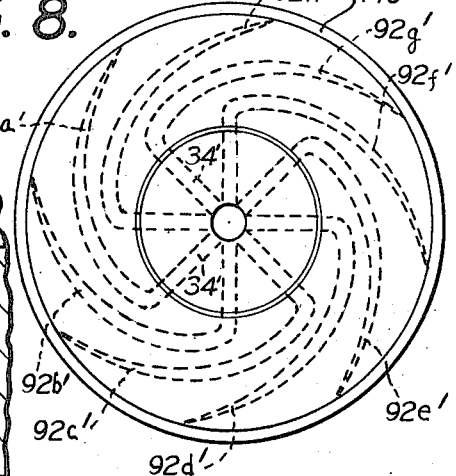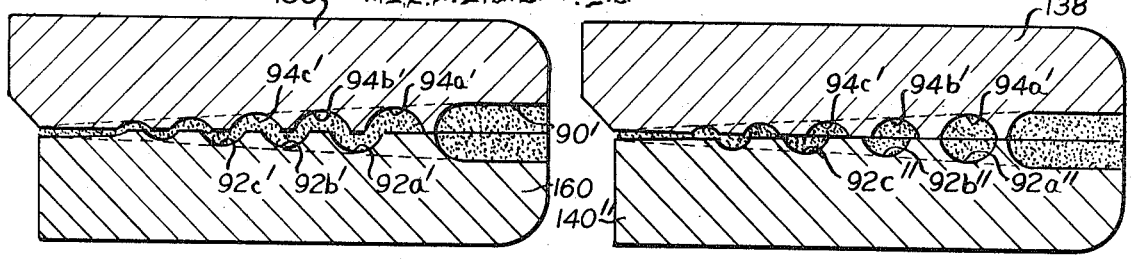

EXTRUSION DIE FOR BLOWING PLASTIC FILM

BACKGROUND AND SUMMARY OF THE INVENTION

Thin plastic film is commonly made by blowing air into a plastic tube as it is extruded from a die. Plastic from different passages is merged on its way to the die discharge outlet, but imperfect mixing or merging of the plastic sometimes causes visible lines in the finished film at places where inadequately mixed plastic streams were brought together. Uneven discharge around the circumference of the die causes differences in thickness and results in a film that is not of uniform gauge, and forms weak spots.

This invention mixes the plastic from different supply passages more thoroughly on its way to the cylindrical clearance that provides the discharge outlet of the die. This is done by providing generally spiral passages leading from the supply passages to the cylindrical clearance upstream from the discharge outlet. The spiral passages increase the length of the distance travelled. A plate in which the passages are formed confronts another annular surface and the surfaces diverge slowly from one another as they extend outward toward the cylindrical clearance leading to the die discharge outlet. This divergence permits plastic to leak radially across the space between spiral grooves in the plate, and the combined radial movement of this leakage between grooves with the spirally travelling plastic in the grooves causes thorough mixing because of the difference in direction of movement of the plastic streams as they contact with one another.

The cross section of the spiral passages decreases so that toward the circumference of the plate where more of the plastic is moving in a radial direction, because of the increased clearance between the diverging surfaces, the velocity of movement along the spiral passages is maintained. There are various modifications of the plate structure from a single plate with spiral grooves in only one side to the use of two plates with confronting faces and complementary grooves in both plates. Single plates with grooves on both sides are another modification; and different combinations of grooves with different radial pitches can also be used to bring together flow of plastic moving in different directions for better mixing.

Other features of the invention relate to the control of flow from the die at different parts of the die circumference and to the safe venting of excess plastic pressure.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 5 is a front elevation, on a greatly reduced scale, of the discharge end of the die shown in FIG. 1, the discharge end being the uppermost end in FIG. 1;

FIG. 6 is a fragmentary sectional view similar to FIG. 1 but showing a modified form of the invention;

FIG. 7 is a front elevation of the upper plate used in the die shown in FIG. 6;

FIG. 8 is a rear elevation of the lower plate used in the die of FIG. 6;

FIGS. 9 and 10 are greatly enlarged sectional views taken on the lines 9—9 and 10—10 of FIGS. 7 and 8 when the plates of these two figures are superimposed on one another as shown in FIG. 6;

DESCRIPTION OF PREFERRED EMBODIMENT

Figure 1:
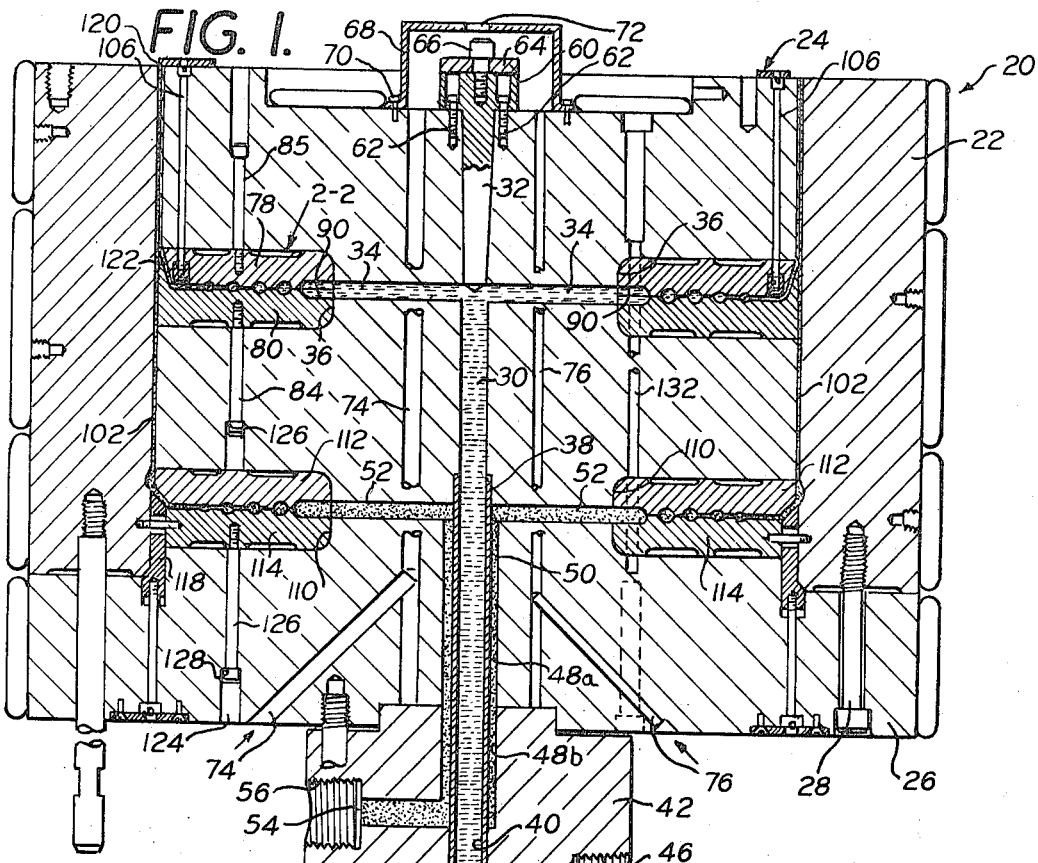
FIG. 1 is a sectional view taken on a diameter of the extrusion die of this invention.

FIG. 1 shows an extrusion die 20 comprising a body portion 22 and a core element 24 which has a flange 26 at its lower end attached to the die body 22 by bolts 28 located at angularly spaced regions around the center axis of the die. Within the core element 24 there is a cylindrical center passage 30 closed at its upper end by a plug 32. There are radial passages 34 leading outwardly from the cylindrical center passage 30; and these radial passages open into a circumferential recess 36 formed around the outside of the core element 34.

The lower portion of the cylindrical center passage 30 extends through a tube 38 which fits into a counterbore in the lower part of the passage 30 which is drilled directly through the core element 24.

The lower end of the tube 38 fits into a counterbore 40 in a rearward or lower block 42 and there is a feed passage 44 leading into the counterbore 40 from the right-hand side of the block 42 as viewed in FIG. 1. A threaded end 46 of the feed passage 44 is provided for receiving a fitting through which plastic is supplied to the cylindrical center passage 30 from an extruder cylinder of the conventional type.

The portion of the tube 38 between the ends which are held in the counterbores already described, passes through aligned openings in the core element 24 and block 42, these openings being designated in FIG. 1 by the reference characters 48a and 48b. The diameter of the openings 48a and 48b is somewhat larger than the outside diameter of the tube 38 so that an annular passage 50 is provided in the space between the tube 38 and the side of the openings 48a and 48b. This annular passage 50 communicates with radial passages 52 at its upper end and these radial passages 52 are at angularly spaced locations around the axis of the die. At the lower end of the annular passage 50 there is a supply passage 54 leading out through the left side of the block 42, as viewed in FIG. 1. A threaded end 56 of the feed passage 54 provides a connection for the feed passage 54 to another source of plastic supplied from another extruder cylinder which is not shown since it is of conventional construction.

The block 42 is attached to the core element 24 by screws 58 at angularly spaced locations around the center axis of the extruder die. The plug 32 at the upper or forward end of the die 20 is preferably tapered to fit a complementary taper of the part of the passage 30 above the radial passages 52. This plug 32 has a flange 60 secured to the core element 24 by screws 62 which are located at angularly spaced regions around the center axis of the die.

The screws 62 are of such strength as to yield and permit the plug 32 to rise in the tapered portion of the passage 30 in the event that pressure below the plug becomes excessive and dangerous to the structure of the guide. Any rising of the plug 32 in the tapered portion of the passage 30 opens a clearance for the escape of plastic from the passage 30 so that pressure within the die is relieved. A plate 64 covers the sockets in which the screw heads of the screws 62 are located so that these screws cannot be projected like bullets in the event that they break when under excessive tension. The plate 64 is attached to the upper end of the plug 32 by a screw 66 and there is a cover 68 attached to the core element 24 by angularly spaced screws 70 for preventing the entire plug 32 from being ejected from the die.

Air for blowing the plastic escapes from the cover 68 through an opening 72 and the air is supplied to the space below the opening 72 through passages 74 and 76 located at angular spacings around the axis of the die and supplied with air through air inlet passages 74 and 76, respectively. This air, under pressure, is supplied from a compressed air source in the conventional manner for extrusion dies for blown plastic. Plates 78 and 80 are held in the circumferential recess 36. These plates 78 and 80 are shown in section, on a larger scale, in FIG. 2. They are made to fit the shape of the cross section of the recess 36 with relief surfaces at regions intermediate the inner and outer ends of the plates around bosses 82 which contact with sides of the recess 36. The plates 78 and 80 are secured to the core element 24 by screws 84 which extend through the core element and thread into openings 86 in the plates 78 and 80.

Figure 3:
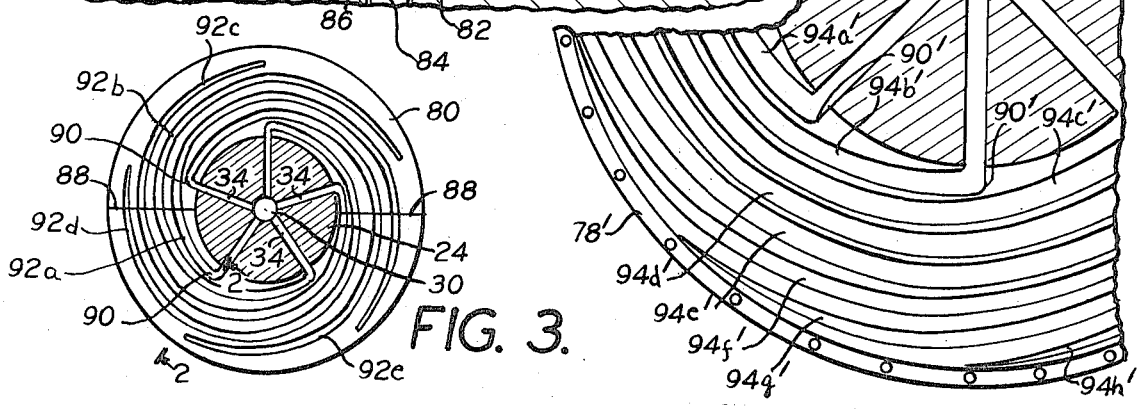
FIG. 3 is a view, on a reduced scale, taken on the line 3—3 of FIG. 2.

FIG. 3 shows a plan view of the plate 80. It is of annular shape and is made in two semi-annular sections that come together along a diametral plane 88. The purpose in making plate 80 into sections is to make it possible to insert the plate into the recess 36 (FIG. 1) of the core element 24, and to remove the plate from the recess when necessary for cleaning or replacement. The portion of the cylindrical element 24 beyond the inner end of the recess into which the plate 80 fits is shown in section in FIG. 3 and indicated by the reference character 24. This Figure shows the radial passages 34 extending outwardly, at angularly spaced locations, around the axis of the center cylindrical passage 30 through which plastic is supplied to the extruder for the radial distribution through the passages 34 to passages of the plate 80 and the other plate that it confronts.

The plate 80 in FIG. 3 is shown with five short radial grooves 90 in position to register with the outer ends of the radial passages 34. Each of these radial grooves 90 communicates with a spiral groove in the face of the plate 90; and these spiral grooves are indicated by the reference characters 92a through 92e.

Each of the spiral grooves 92a-e extends outwardly along its spiral course to a location near the circumference of the plate 80. The depth of the grooves 92a-e becomes progressively less as the groove extends towards the circumference of the plate, for reasons which will be explained in connection with FIG. 2, and each groove 92a-e preferably diminishes to a zero depth before it reaches to the outer circumference of the plate 80.

Referring again to FIG. 2, the plate 78 has grooves corresponding to the grooves 92a-e of the plate 80, and these grooves of the plate 78 register with the grooves in the confronting face of the plate 80 to form passages. Not all of the grooves of the plate 78 show in the sectional view of FIG. 2 and those that do show are indicated by the reference characters 94a-d, while the passages formed by the grooves are indicated by the reference characters 96a-d. The section in FIG. 2 is taken on the section line 2—2 of FIG. 3 but is on a larger scale.

Figure 2:
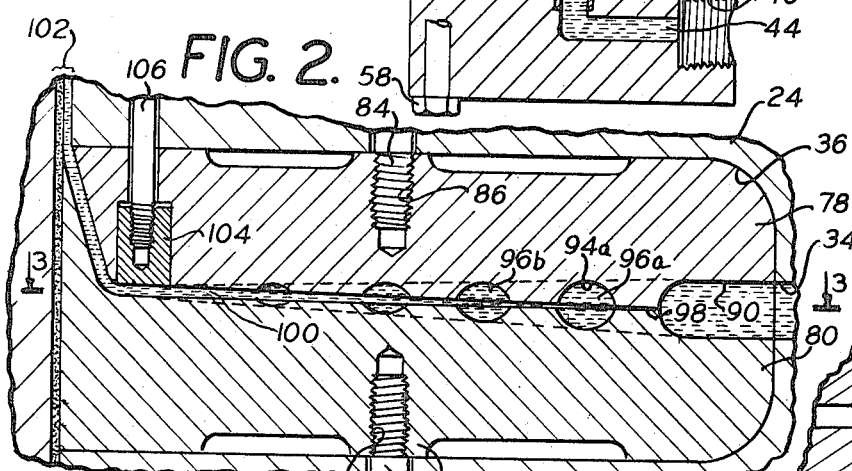
FIG. 2 is a greatly enlarged view of a portion of the structure shown in FIG. 1.

The plates 78 and 80 preferably contact with one another around a circular or annular region 98; and the confronting faces of the plates 78 and 80 slowly diverge from one another as they extend toward the outer circumference, that is, toward the left in FIG. 2, of the recess 36. This divergence produces a progressively increasing clearance between the confronting faces of the plates 78 and 80 outward from the contact region 98 and this progressively increasing clearance is designated in FIG. 2 by the reference character 100.

It will be evident from FIG. 2 that plastic moving spirally outward through the passage 96a will begin to leak from the passage 96a radially outward across the space between the passage 96a and the next radial passage 96b. As each of the spiral passages approaches closer to the outer circumferences of the plates 78 and 80, this radial leakage from the passages 96a-d will become progressively greater because of the increasing cross-section of the clearance 100. In order to maintain some continued velocity of the plastic in the passages 96a-d as the amount of plastic in these passages decreases, the passages 96a-d are made progressively shallower and therefore of lesser cross section as they extend spirally toward the outer circumference of the plates 78 and 80.

If the spiral passages 96a-d eventually reached the outer circumference of the plates 78 and 80, they would supply plastic to cylindrical clearance 102 between the core element 24 and the die body 20 and this plastic would be supplied at five angularly spaced locations around the cylindrical clearance 102. By having the spiral passages 96a-d decrease to zero cross section before reaching the cylindrical clearance 102, all of the plastic flowing to the cylindrical clearance 102 is forced into a radial direction of flow which is uniform throughout the entire circumference of the plates 78 and 80 and thus plastic is supplied around the full extent of the cylindrical clearance 102 at a uniform rate at every point around the circumference and with the plastic thoroughly mixed as a result of the stirring effect produced by the interaction of the spiral and radial flows of plastic as it moves radially outward between the confronting surfaces of the plates 78 and 80.

In order to control the rate of flow of plastic from between the plates 78 and 80, for any given pressure, a ring 104 is recessed into the face of the plate 78 at a location near the outer circumference of the plate 78;

and this ring 104 can be moved toward and from the confronting surface of the plate 80 by a push-pull screw 106 operated from a location at the front end of the die.

Referring again to FIG. 1, the radial passages 52 of the core element 24 lead it to another circumferential recess 110 of the core element 24. Within this recess 110 there are two plates 112 and 114 which are similar to the plates 78 and 80 already described except that the outer peripheral portions of the plates 112 and 114 are somewhat differently shaped for guiding the plastic flow into the cylindrical clearance 102 between the body 22 of the die and the core element 24. Instead of the ring 104 of FIG. 2, the recess 110 has a ring 118 which will be described in connection with FIG. 6. Otherwise the plates 112 and 114 operate on the same principle as the plates 78 and 80 and are of similar construction for mixing plastic as it flows from the radial supply passages 52 and for distributing the plastic evenly around the full circumferential extent of the cylindrical clearance 102.

Plastic supplied from between the plates 112 and 114 flows upward through the cylindrical clearance 102 and past the plates 78 and 80 to a discharge outlet 120 of the die. The cylindrical clearance 102 is preferably slightly greater above the recess 36 so that plastic supplied from between the plates 78 and 80 can flow upward, adjacent to the stream from the recess 110, to the discharge outlet 120. To prevent the plastic streams from the different recesses 36 and 110 from mixing in the cylindrical clearance 102, the plates 78 and 80 are shaped to provide a sloping annular passage 122 which brings the plastic from the upper recess 36 into the cylindrical clearance 102 at an acute angle less than 45° to the direction of flow of the plastic from the lower recess 110 so as to avoid turbulence and promote laminar flow of the inner and outer layers of plastic flowing upward in the cylindrical clearance 102.

In practice the plastic from the recess 36 may be of a different color from that from the recess 110 or it can be a different grade or kind of plastic so that the final sheet blown from the extruded plastic can have different color and different character surfaces on its opposite sides.

A number of modifications of plate construction will be described in connection with subsequent figures of the drawing, and it should be understood that the plates in the recesses 36 and 110 need not be the same and are sometimes made differently because of the fact that the plastic which is to be passed through the different recesses 36 and 110 is different and one may mix more easily than the other.

Figure 4:
FIG. 4 is a fragmentary view, on a larger scale than FIG. 3, showing a portion of a plate similar to FIG. 3 but with eight radial passages and a corresponding number of spiral passages or grooves.

FIG. 4 shows a plate 80' which is similar to the plate 80 shown in FIG. 3 except that it has eight grooves instead of five. All of the parts in FIG. 4 which correspond to parts shown in FIG. 3 are indicated by the same reference character with a prime appended. FIG. 4 shows the passages 92a'-g' becoming narrower as they extend toward the outer circumference of the plate 80'. They also become shallower and this change in both the width and depth of the grooves reduces their cross section to compensate for the smaller amount of plastic flowing spirally on the grooves as the grooves approach the outer circumference of the plate 80'.

FIG. 5 is a top plan view, on a reduced scale, of the die 20 shown in FIG. 5. The cylindrical extent of the outlet passage 120 is clearly shown; and so are the angular spacings of the various screws. The screws 84 which hold the upper plate 78 (FIG. 1) in place are inserted through the top of the core element 24. There is no view of the other end of the die but it will be understood that the screws 84 that hold the back plate 80 in the upper recess 36 have to be inserted through the back of the core element 24 and that they are located at angularly spaced regions around the passages of the die in the same way as the screws 84 shown in FIG. 5.

There is a special feature shown in FIG. 1 in connection with the lower screws 84, and this is made necessary because of the second recess 110 holding the plates 112 and 114. The screws 84 for the plate 80 have to be inserted before the plates 112 and 114 are placed in the recess 110. An opening 124 through which the screws 84 for the plate 80 are inserted has three different diameters at different regions along its length. The upper portion of the openings 124 is of a diameter to receive the shank of the screws 84 that thread into the plate 80. There is a shoulder 126 where the opening 124 increases in diameter and the head of the screw 84 contacts with this shoulder 126 to limit upward movement of the screw 84 so that the screw can be used to hold a plate 80 into firm contact with the lower surface of the recess 36.

Below the shoulder 126, the opening 124 has a diameter large enough for the head of the screw 84 to pass upward to the shoulder 126. After the plates 112 and 114 are inserted into the recess 110, screws 126 are inserted through the opening 124 and screwed into the plate 114 to secure the plate 114 to the bottom surface of the recess 112. The shank of each of the screws 126 is preferably as large as the head of the screws 84 that hold the plate 80 so that these screws 126 fit the larger portion of the opening 124 which has the increased diameter for permitting passage of the head of the screw 184. There is a counterbore at the lower end of the opening 124 providing a shoulder 128 against which the head of the screw 126 in each of the openings 124 can contact to limit upward movement of the screw 126 in each opening 124.

The upper plate 112 is held in register with the lower plate 114 by dowels 132 extending through the plates 78 and 80 at angularly spaced locations between the radial passages 90 of the plates 78 and 80. The height of the recess 110 limits the clearance between the confronting faces of the plates 112 and 114 where these plates are subjected to the plastic pressure between them.

FIG. 6 shows a modified plate construction. Since the modification is in the plate construction, the drawing is simplified by showing it applied to a die that extrudes only one layer of plastic. Parts in FIG. 6 corresponding to those in FIG. 1 are indicated by the same reference character with a prime appended. The important difference in the plates 138 and 140 of FIG. 6 is that these plates have grooves which have different spiral pitch on one plate as compared to the other. For example, the plate 138 may have the spiral pitch illustrated in FIG. 7 while the plate 140 has the spiral pitch shown in FIG. 8.

While the plates 138 and 140 have the same number of spiral grooves, those in the plate 140 are substantially shorter because they have a faster pitch and therefore approach the outer circumference of the plate in a shorter angular distance. The plate 138 is shown in FIG. 7 with the grooved surface facing the observer; whereas the plate 140 is shown in FIG. 8 with the grooved surface facing away from the observer, and therefore dotted. This shows the grooves in the relation in which they actually are to one another when the plates are confronting one another as shown in FIG. 6. It will be apparent that with this different pitch, no groove of either plate registers with a groove of the other plate throughout its entire length. Grooves of the confronting plates register with one another at certain angular locations around the center of the plates and become progressively more out of register as they extend either clockwise or counterclockwise.

FIG. 6 illustrates how the grooves of the upper plate 138 register with certain grooves of the lower plate 140 at the particular plane of section on which FIG. 6 is taken and how other grooves confront ungrooved portions of the surface, that is, portions of the surface between grooves of the other plate at this same plane of section. The criss-crossing of grooves in the confronting faces of the plates 138 and 140 increases turbulence and promotes better mixing of the plastic; and these plates 138 and 140 have the same feature as already described in connection with FIGS. 1 and 2 which have the confronting faces of the plates diverging slowly from one another as the plates extend toward the outer circumference of their faces. Thus the crisscross flow of the spiral passages is combined with the progressively increasing radial flow caused by leakage of plastic from the outer sides of the passages formed by the grooves and the resulting flow through the progressively increasing clearance between the plates toward the outer circumference of each of the plates.

FIG. 6 also shows a ring 118 which is moved up and down by a push-pull screw 144 to change the clearance between the ring 118 and a complementary sloping face 146 of the upper ring 138. To promote laminar flow, the lower portion of the cylindrical clearance 102' is provided with a stream line outer wall 150 where the plastic flowing with a radial component is deflected progressively upward and then restricted to a narrow cross section for the portion of the cylindrical clearance 102' above the recess 110' in which the plates 138 and 140 are located.

FIG. 9 shows an upper plate 158 and a lower plate 160 with spiral grooves similar to those shown in FIG. 4 and with the same pitch for the grooves in each of the confronting faces of the plates 158 and 160. The peculiar correlation of the grooves in the confronting faces is obtained by having the grooves in one plate out of phase in a radial direction with those of the other plate. The confronting faces of the plates 158 and 160 diverge toward the outer (left hand) circumference of the plates as in the other modifications already described.

FIG. 10 is a sectional view through the plate 138 and another plate 140'' which has grooves 92a'', 92b'', etc., which have a different spiral pitch from the grooves of the upper plate 138 but not as much difference as in the case of the plates 138 and 140. Thus the grooves move out of phase with one another somewhat more slowly as they extend radially outward than is the case in FIG. 6, and it will be noted also that in FIG. 10 there are more grooves in the bottom plate 140'' than there are in the plate 140 at any particular section because of the fact that the grooves are longer and therefore have more overlap.

Figure 11:
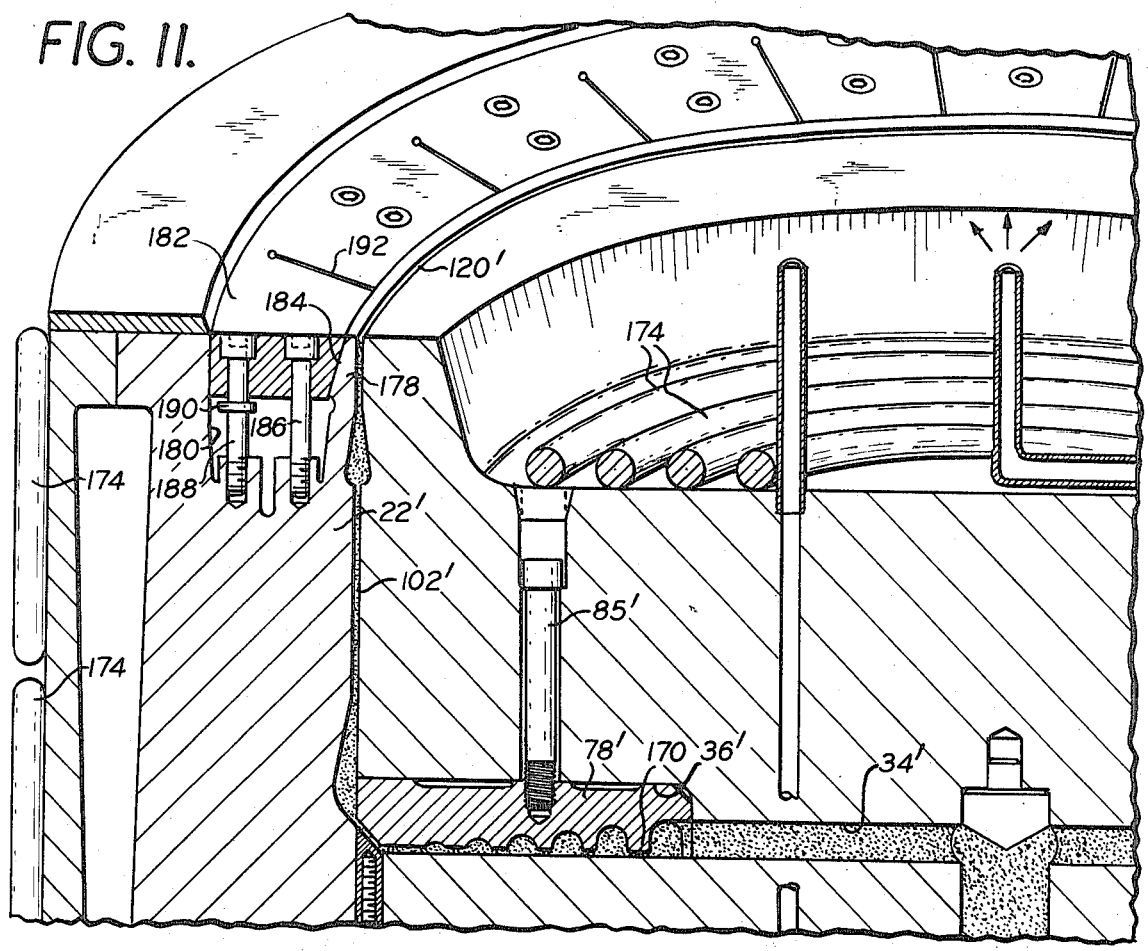
FIG. 11 is a fragmentary isometric view, mostly in section, showing still another modification of the spiral passage construction and showing means for adjusting the lip and of the discharge outlet of the die to balance the flow of plastic circumferentially around the discharge outlet.

FIG. 11 shows the plate 78' held in a recess 36' by screws 85'. The construction differs from that described in claim 1 in that the grooved face of the plate 78' confronts the bottom face of the recess 36' instead of confronting a complementary plate with a grooved face. The bottom face of the recess 36' is indicated by the reference character 170 and the plate 78' and the plate 78' contacts with the face 170 near the inner circumference of the plate 78' but the grooved face of the plate 70' diverges progressively from the confronting face 170 of the recess 36' in the same manner as the confronting faces of the plates 78 and 80 diverge from one another in FIG. 1. The operation is similar to that of FIG. 1 except that all of the spiral flow of the plastic is on the upper side of the region at which the plastic leaks over the spaces between spiral grooves instead of being both above and below it as in the case of FIG. 1. The mixing effect is less than with the construction shown in FIG. 1 but the construction is simpler and less expensive and for many applications produces ample mixing effect.

FIG. 11 also shows heater coils 174 which are of conventional construction for extrusion dies and it shows a novel construction for controlling the width of the discharge outlet 120' at the face of the die.

The cylindrical clearance 102' between the core and the body of the die has a stiffly flexible lip 178 around the outer edge of the discharge outlet 120'. Outside of this lip 178 there is a groove 180 which is annular and which is deep enough to give the lip 178 a substantial unsupported height above its connection to the die body 22' of which the lip 178 is preferably an integral part. The lip 178 extends around the entire circumference of the discharge outlet 120' and it has a wedge ring 181 located in the annular trough 180 in contact with a complementary tapered wedge surface 182 of the lip 178. If the wedge ring 182 is pulled down in the trough 180, its movement along the tapered surface 184 of the lip 178 forces the lip 178 to bend inward and thus reduce the width of the discharge outlet 120' of the die. If the ring 182 moves upward in the trough 180, the lip 178 springs outward again and thereby increases the width of the discharge outlet.

The ring 182 is pulled downward by pull screws 186 which are threaded to the die body 22' and the ring 182 is pushed upward by push screws 188 which have shoulders 190 that contact with the underside of the ring 182. These screws 186 and 188 are distributed at fairly closely spaced angular locations around the entire circumference of the die; and there are slits 192 at locations between successive screws that permit the inner diameter of the ring 182 to contract to accommodate itself to the reduced width of the trough 180 as the ring 182 is pulled down into the trough to constrict the discharge outlet of the die.

By using the screws 188 and 186 at different locations around the die, the width of the discharge outlet can be balanced so as to obtain uniformity in the thickness of the wall of the plastic tube which is blown by the die.

Figure 12:
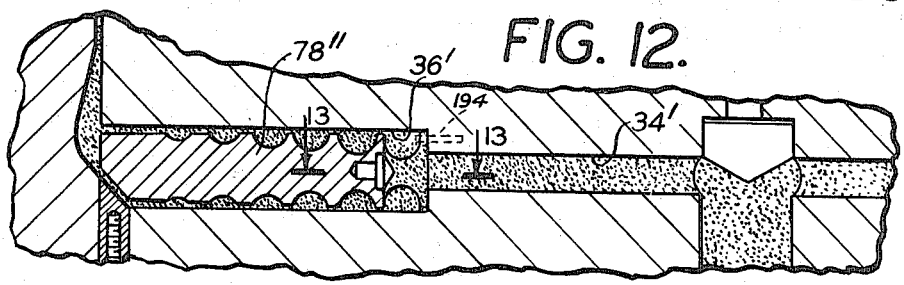
FIG. 12 is a fragmentary sectional view showing a modification of the construction illustrated in FIG. 11 with spiral passages on both sides of the plate.

FIG. 12 shows another modified construction in which a plate 78'' is provided with grooved faces on both sides and these grooved faces confront top and bottom surfaces of the recess 36' and diverge from both of these confronting faces as the surfaces of the plate extend radially outward.

The plate 78' cannot move radially outward when its semi-circular sections have been inserted into the recess 36' and connected together but provision must be made to maintain the entrances of the grooves in register with the supply passages 34'. This register is obtained by having a dowel 194 extend from the inner wall of the recess 36' into a complementary opening in the plate 78'' as shown in FIG. 12.

The preferred embodiment of the invention has been illustrated and described and some modifications have been disclosed; but other changes and modifications can be made without departing from the invention as defined in the claims.

What is claimed is:

1. An extrusion die for blown film including in combination a die body having a center axis and a core element that fits inside the die body with a cylindrical clearance surrounding said axis and said core and extending for a distance downward from a top face of the die, said cylindrical clearance being the discharge outlet of the die, the core element having an annular circumferential recess therein, an axially extending, centrally located supply passage in the core element with a plurality of branch passages leading radially outward away from the die body axis and communicating with the circumferential recess at angularly spaced locations around the circumference of said recess, a first annular surface in the recess, a second annular surface in the recess confronting the first annular surface, both annular surfaces extending radially outward in the recess and away from said axis, a plurality of distributing passages extending across the first annular surface from the respective branch passages in directions having both radial and angular components and having walls that displace plastic material simultaneously in both radial and angular directions for distributing the plastic material from said branch passages to and around the circumferential extent of the cylindrical clearance that forms the discharge outlet of the die.

2. The extrusion die described in claim 1 characterized by the passages in the first annular surface being grooves, the second annular surface in the recess confronting the open sides of the grooves in the first annular surface and forming with said grooves parts of said distributing passages, there being a clearance between the confronting annular surfaces, said clearance extending radially and also angularly, the angular extent of said clearance being around most of the angular extent of the annular surfaces said clearance increasing as said annular surfaces extend radially outward toward the cylindrical clearance that forms the discharge outlet of the die so that some of the plastic in the distributing passages can leak radially across space between the distributing passages in the direction of the outer circumferences of the annular surfaces for more uniform flow into said cylindrical clearance.

3. The extrusion die described in claim 1 characterized by the branch passages of the core element being generally radial of said axis and the distributing passages of the first annular surface having radially extending inner end portions that are in general alignment with the respective passages of the core element.

4. The extrusion die described in claim 2 characterized by the distributing passages being generally spiral grooves in the first annular surfaces and the confronting faces of the annular surfaces being in contact with one another at the radially inner end portion of said confronting faces to prevent flow of plastic other than through the distributing passages at the inner ends thereof.

5. The extrusion die described in claim 2 characterized by the confronting annular surfaces being substantially plane surfaces except for grooves in the first annular surface constituting said distributing passages, and the divergence of said surfaces imparting a slightly conical contour to at least one of said surfaces.

6. The extrusion die described in claim 1 characterized by a plate in the recess, one surface of which is said first annular surface, and detachable fastening means holding the plate in the recess but removable for replacement by a different plate.

7. The extrusion die described in claim 6 characterized by the plate being attached to the core element by detachable fastening means that hold the plate in fixed relation to the passages in the core element.

8. The extrusion die described in claim 2 characterized by the passages in the first annular surface being generally spiral and of decreasing cross-section as they extend outward toward the circumference of the plate to compensate for the reduced flow of plastic along said spiral passages as a result of the increasing rate of leakage of plastic radially outward through the increasing clearance between the confronting surfaces.

9. The extrusion die described in claim 1 characterized by two plates in the circumferential recess with surfaces of said plates confronting one another and constituting the annular surfaces and with complementary generally spiral grooves in the confronting surfaces of both plates forming said distributing passages.

10. The extrusion die described in claim 9 characterized by the complementary grooves of both plates being of the same number and same pitch and being in register with one another so that each of the generally spiral passages is formed partly by a groove of each plate throughout the full length of each spiral passage.

11. The extrusion die described in claim 9 characterized by the grooves in the surface of one plate being of a different spiral pitch from the grooves in the surface of the other plate that confronts the first plate, whereby the grooves in the different plates are out of register with one another along most of the lengths of said grooves.

12. The extrusion die described in claim 11 characterized by the spiral pitch of the grooves in the different plates, though of different pitch, having the curve of their spiral in the same direction on both plates to increase the area of overlap of each groove on one plate as it crosses each groove on the other plate.

13. The extrusion die described in claim 11 characterized by each of the plates having the same number of spiral grooves, and the grooves of each plate starting at the same branch of passages as the grooves of the other plate, the grooves of steeper pitch approaching the circumference of their plate more rapidly than those of the other plate and being, therefore, of shorter length, whereby the grooves of the different plates at different angular positions around the centers of the annular surfaces of the plates are in different relation to one another.

14. The extrusion die described in claim 2 characterized by a plate having annular surfaces at its opposite sides and generally spiral grooves in both of said annular surfaces, and the plate having center passages, through the inner face of the annular plate, each of which center passages communicates with spiral grooves on opposite faces of the plate, the annular surfaces of the plate confronting annular surfaces of the recess, and one of the annular surfaces of the plate constituting said first annular surface, and its confronting annular face of the recess constituting said second annular surface.

15. The extrusion die described in claim 2 characterized by clearance between the confronting annular surfaces merging with the cylindrical clearance at a region of juncture that has an outer wall of the cylindrical clearance curved in an axial direction to produce an increase in the cylindrical clearance and to provide a gradual change in the direction of flow of the plastic from its radial flow across the circumferential region of the annular surfaces into the cylindrical clearance and axially toward the discharge outlet of the die, the cylindrical clearance beyond said region of juncture decreasing to the clearance of the discharge outlet of the die.

16. The extrusion die described in claim 2 characterized by clearance between the confronting annular surfaces merging with the cylindrical clearance at a region of juncture, and a ring at the region of juncture forming a portion of the length of one side of the part of the clearance through which plastic flows, and means for moving the ring toward and from the other side of said clearance through which the plastic flows to change the cross section of that clearance and thereby regulate the rate of flow of plastic to the discharge outlet of the die.

17. The extrusion die described in claim 2 characterized by clearance between the confronting annular surfaces merging with the cylindrical clearance at a region of juncture, a portion of one of the annular surfaces being adjustable toward and from the other annular surface that it confronts to change the clearance between said annular surface and thereby change the cross section of the passage provided by that clearance and thus regulate the rate of flow of plastic to the discharge outlet of the die.

18. The extrusion die described in claim 1 characterized by the core element having two axially spaced circumferential recesses therein, two different supply passages in the core element, each with its own branch passages opening into a different one of the recesses, different confronting annular surfaces in each recess with distributing passages for distributing plastic material from the branch passages for that recess to and around the angular extent of the cylindrical clearance, the plastic from the different recesses flowing side by side through the cylindrical clearance to the discharge outlet of the die.

19. The extrusion die described in claim 18 characterized by there being two plates in each recess and the core element being continuous from a front fact thereof to a back face beyond both of the recesses, the plates having adjacent faces that confront one another and that constitute said confronting annular surfaces, each of the plates being made in two semi-circular sections that can be inserted into its recess from opposite sides of the core element, detachable fastening means for holding the different plates in their recesses including bolts that extend through openings in the core element in directions generally parallel to said axis of the die, the front plate being held by bolts extending through the front of the core element to the front recess, the back plate in the front recess being held by bolts that are inserted through the back face of the core element and through the back recess before the plates are inserted into the back recess, there being shoulders between the recesses in said openings for contact with the bolts that hold the back plate of the front recess and the openings rearward of the shoulders being larger than the diameter of the heads of the bolts that hold the back plate of the front recess, and larger bolts for holding the back plate of the back recess, said larger bolts extending through the same openings through which the bolts for the back plate of the front recess were inserted.

20. The extrusion die described in claim 18 characterized by the passages from the front recess merging into an annular passage that is continuous in width around the full circumference of the front recess and that communicates with the cylindrical clearance at an angle of less than 45° to the direction of flow of plastic from the back recess through the cylindrical clearance and toward the discharge outlet of the die to bring the plastic flow from the front recess into contact with that from the back recess while maintaining laminar flow.

* * * * *